United States Patent
Schmit et al.

(10) Patent No.: US 8,233,527 B2
(45) Date of Patent: Jul. 31, 2012

(54) SOFTWARE VIDEO TRANSCODER WITH GPU ACCELERATION

(75) Inventors: Michael L. Schmit, Cupertino, CA (US); Rajy Meeyakhan Rawther, Santa Clara, CA (US)

(73) Assignee: Advanced Micro Devices, Inc., Sunnyvale, CA (US)

(*) Notice: Subject to any disclaimer, the term of this patent is extended or adjusted under 35 U.S.C. 154(b) by 903 days.

(21) Appl. No.: 12/264,892

(22) Filed: Nov. 4, 2008

(65) Prior Publication Data

US 2009/0060032 A1 Mar. 5, 2009

Related U.S. Application Data

(63) Continuation-in-part of application No. 12/189,060, filed on Aug. 8, 2008, and a continuation-in-part of application No. 11/960,640, filed on Dec. 19, 2007.

(60) Provisional application No. 60/928,799, filed on May 11, 2007.

(51) Int. Cl.
*G06K 9/36* (2006.01)
*G06T 1/00* (2006.01)

(52) U.S. Cl. ............... 375/240; 382/232; 345/501

(58) Field of Classification Search ........... 375/240, 375/240.01, 240.16, 240.2, 240.24, 240.25, 375/240.26, 240.29; 382/232, 233, 234, 382/236, 238; 345/501–506, 522
See application file for complete search history.

(56) References Cited

U.S. PATENT DOCUMENTS

| 5,325,493 | A | * | 6/1994 | Herrell et al. | 712/201 |
|---|---|---|---|---|---|
| 5,329,615 | A |  | 7/1994 | Peaslee et al. | |
| 5,452,103 | A |  | 9/1995 | Brusewitz | |
| 5,712,664 | A | * | 1/1998 | Reddy | 345/519 |
| 5,757,385 | A | * | 5/1998 | Narayanaswami et al. | 345/505 |
| 5,844,569 | A |  | 12/1998 | Eisler et al. | |
| 5,892,521 | A | * | 4/1999 | Blossom et al. | 345/501 |
| 5,953,506 | A | * | 9/1999 | Kalra et al. | 709/231 |
| 6,058,143 | A | * | 5/2000 | Golin | 375/240.16 |
| 6,078,339 | A | * | 6/2000 | Meinerth et al. | 345/522 |
| 6,141,020 | A |  | 10/2000 | Larson | |
| 6,141,023 | A |  | 10/2000 | Meinerth et al. | |
| 6,167,084 | A | * | 12/2000 | Wang et al. | 375/240.02 |
| 6,266,072 | B1 | * | 7/2001 | Koga et al. | 345/505 |

(Continued)

OTHER PUBLICATIONS

The Guru of 3D: "ATI Avivo Xcode pack for HD4800 series", Jun. 27, 2008, pp. 1-3, URL:http://downloads.guru3d.com/ATI-Avivo-Xcode-pack-for-HD4800-series-download-1973.html, (last visited Nov. 18, 2011).

(Continued)

*Primary Examiner* — Michael Thier
*Assistant Examiner* — Prince A Mensah
(74) *Attorney, Agent, or Firm* — Volpe and Koenig, P.C.

(57) ABSTRACT

Embodiments of the invention as described herein provide a solution to the problems of conventional methods as stated above. In the following description, various examples are given for illustration, but none are intended to be limiting. Embodiments are directed to a transcoding system that shares the workload of video transcoding through the use of multiple central processing unit (CPU) cores and/or one or more graphical processing units (GPU), including the use of two components within the GPU: a dedicated hardcoded or programmable video decoder for the decode step and compute shaders for scaling and encoding. The system combines usage of an industry standard Microsoft DXVA method for using the GPU to accelerate video decode with a GPU encoding scheme, along with an intermediate step of scaling the video.

27 Claims, 7 Drawing Sheets

U.S. PATENT DOCUMENTS

| | | | |
|---|---|---|---|
| 6,366,704 B1 | 4/2002 | Ribas-Corbera et al. | |
| 6,434,197 B1* | 8/2002 | Wang et al. | 375/240.29 |
| 6,526,583 B1* | 2/2003 | Auld et al. | 725/139 |
| 6,570,571 B1* | 5/2003 | Morozumi | 345/505 |
| 6,842,180 B1* | 1/2005 | Maiyuran et al. | 345/541 |
| 6,909,432 B2* | 6/2005 | Alcorn et al. | 345/506 |
| 6,933,943 B2* | 8/2005 | Alcorn | 345/506 |
| 7,293,170 B2 | 11/2007 | Bowler et al. | |
| 7,522,167 B1 | 4/2009 | Diard et al. | |
| 7,558,428 B2 | 7/2009 | Shen et al. | |
| 7,626,637 B2 | 12/2009 | Chiu et al. | |
| 7,673,304 B2 | 3/2010 | Gosalia et al. | |
| 2001/0033619 A1* | 10/2001 | Hanamura et al. | 375/240.26 |
| 2002/0075954 A1* | 6/2002 | Vince | 375/240.01 |
| 2003/0227974 A1* | 12/2003 | Nakamura et al. | 375/240.25 |
| 2004/0170330 A1* | 9/2004 | Fogg | 382/232 |
| 2004/0266529 A1 | 12/2004 | Chatani | |
| 2005/0024363 A1* | 2/2005 | Estrop | 345/501 |
| 2005/0047501 A1* | 3/2005 | Yoshida et al. | 375/240 |
| 2006/0056708 A1* | 3/2006 | Shen et al. | 382/232 |
| 2006/0114260 A1* | 6/2006 | Diard | 345/505 |
| 2007/0091997 A1 | 4/2007 | Fogg et al. | |
| 2008/0122860 A1 | 5/2008 | Amann et al. | |

OTHER PUBLICATIONS

"The new ATI Radeon HD 4800 Graphics Card", Aug. 8, 2008, pp. 1-2, URL:http://www.hightech-edge.com/amd-ati-radeon-hd-4800-series-graphics-card/1956; (last visited Nov. 18, 2011).

Guibin Shen et al.: Accelerating video decoding using gpu, Proceedings of International Conference on Acoustics, Speech and Signal Processing (ICASSP'03), Apr. 6-10, 2003, Hong Kong, China, vol. 4, pp. IV_772-IV_775.

Form PCT/IB/326, "PCT Notification Concerning Transmittal of International Preliminary Report on Patentability", 1 pg., May 19, 2011.

Form PCT/IB/373, "PCT International Preliminary Report", 1 pg., May 10, 2011.

Form PCT/ISA/237, "PCT Written Opinion of the International Searching Authority", 4 pgs., May 10, 2011.

* cited by examiner

SOFTWARE VIDEO TRANSCODER WITH GPU ACCELERATION

CROSS-REFERENCE TO RELATED APPLICATIONS

The present application is a Continuation-in-Part application of currently pending patent application Ser. No. 12/189,060, entitled "Software Video Encoder with GPU Acceleration," filed on Aug. 8, 2008, which is a Continuation-In-Part application of U.S. patent application Ser. No. 11/960,640, filed Dec. 19, 2007, which claims the benefit of U.S. Provisional Patent Application No. 60/928,799, filed May 11, 2007, and which is related to U.S. patent application Ser. No. 11/951,222, filed Dec. 5, 2007, all of which are incorporated herein by reference in their entirety.

FIELD

The disclosed embodiments relate generally to video display technology, and more specifically to transcoding digital video data.

BACKGROUND OF THE DISCLOSURE

Transcoding is the direct digital-to-digital conversion of one digitally encoded format to another format. Transcoding can be found in many areas of content adaptation and is often used to convert incompatible or obsolete data into a more suitable format. It is also used to archive or distribute content on different types of digital media for use in different playback devices, such as converting songs from CD format to MP3 format for playback on computers and MP3 players. Transcoding is also commonly used in the area of mobile phone content adaptation. In this case, transcoding is necessary due to the diversity of mobile devices and their capabilities. This diversity requires an intermediate state of content adaptation in order to make sure that the source content will adequately play back on the target device.

One popular area in which transcoding is used is the Multimedia Messaging Service (MMS), which is the technology used to send or receive messages with media (image, sound, text and video) between mobile phones. For example, when a camera phone is used to take a digital picture, a high-quality image usually of at least 640×480 resolution is created. Sending the image to another phone may require that this high resolution image be transcoded to a lower resolution image with less color in order to better fit the target device's screen size and display limitations. Transcoding is also used by home theatre software, such as to reduce the usage of disk space by video files. The most common operation in this application is the transcoding of MPEG-2 files to the MPEG-4 format. With the huge number of online multimedia content and number of different devices available, real-time transcoding from any input format to any output format is becoming a necessary to provide true search capability for any multimedia content on any mobile device.

Present transcoding schemes typically utilize only the CPU resources of the processing system. Because of the size of video data, this can present a substantial processing overhead for the system, while additional available resources, such as GPU bandwidth often is underutilized in such operations.

What is desired, therefore, is a transcoding process that utilizes both GPU and CPU resources for the tasks performed in the transcode pipeline.

BRIEF DESCRIPTION OF THE DRAWINGS

Embodiments are illustrated by way of example and not limitation in the figures of the accompanying drawings, in which like references indicate similar elements and in which.

DETAILED DESCRIPTION

Embodiments of the invention as described herein provide a solution to the problems of conventional methods as stated above. In the following description, various examples are given for illustration, but none are intended to be limiting. Embodiments are directed to a transcoding system that shares the workload of video transcoding through the use of multiple central processing unit (CPU) cores and/or one or more graphical processing units (GPU), including the use of two components within the GPU: a dedicated hardcoded or programmable video decoder for the decode step and compute shaders for scaling and encoding. The system combines usage of an industry standard Microsoft DXVA method for using the GPU to accelerate video decode with a GPU encoding scheme, along with an intermediate step of scaling the video.

Figure 1:
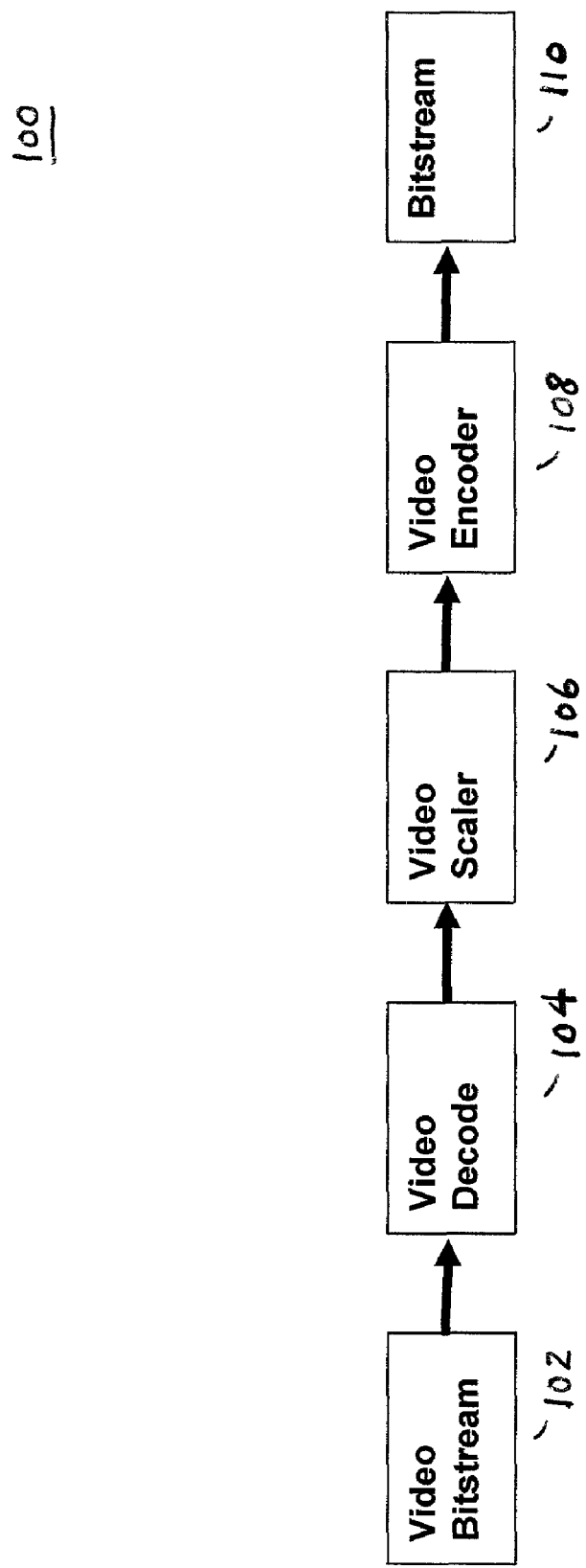
FIG. 1 is a block diagram of a video transcoding pipeline that implements a method of video transcoding, under an embodiment.

Transcoding generally refers to the process of transforming video data from a first format to a second format. Transcoding involves starting with encoded video and encoding it again after a decode process. For example, source video that is encoded in one format and stored digitally is decoded, and then encoded to another format, or even re-encoded to the same format. Intermediate operations may also be performed on the transcoded video, such as scaling, blending with other video, and so prior to encoding in the second video format. FIG. 1 is a block diagram of a video transcoding pipeline that implements a method of video transcoding, under an embodiment. As shown in FIG. 1, system 100 includes a video bitstream 102 that is encoded in a first data format. The bitstream is decoded in video decode process 104. The decoded video data is then scaled using video scaler 106. The scaled video data is then encoded in video encoder 108 to produce a bitstream 110 that is formatted in a second video format.

Figure 2:
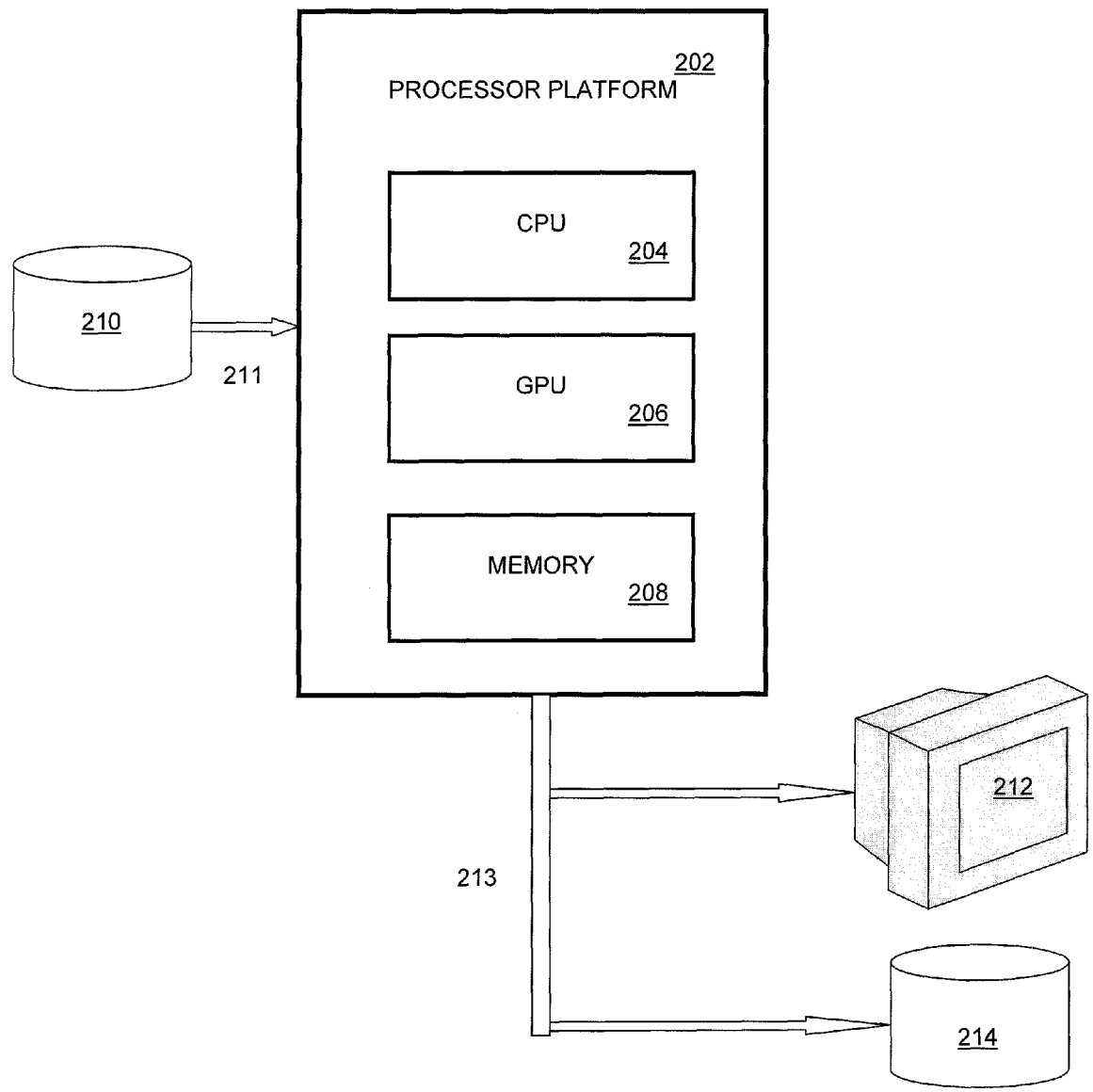
FIG. 2 is a block diagram of a processing system implementing a video transcoder pipeline, under an embodiment.

In one embodiment, the video transcoding pipeline of FIG. 1 is implemented in a processing system that comprises a processing platform including at least one central processing unit (CPU) and at least one graphics processing unit (GPU). FIG. 2 is a block diagram of a processing system implementing a video transcoder pipeline, under an embodiment. For the system of FIG. 2, video data in a first format is stored in data store 210 and transmitted to processor platform 202 in accordance with the first video format 211. The processor platform 202 includes a CPU 204, a GPU 206, and memory 208. The GPU 206 may be a graphics processing unit that is separate from the CPU, but that is provided on the same motherboard or card of the processor platform 202. It may also be provided as a separate unit that is coupled to CPU over a bus or similar interconnection. Alternatively, GPU 206 may represent graphical processing circuits or functionality that is tightly coupled or provided as functionality within CPU 204. A transcoding process is implemented through a combination of functions provided by one or more of CPU 204 and GPU 206 to produce video data in a second format 213, which can be transferred to a datastore 214 and/or displayed through display device 212, or transmitted to other devices over interface links or networks, such as the Internet.

Figure 3:
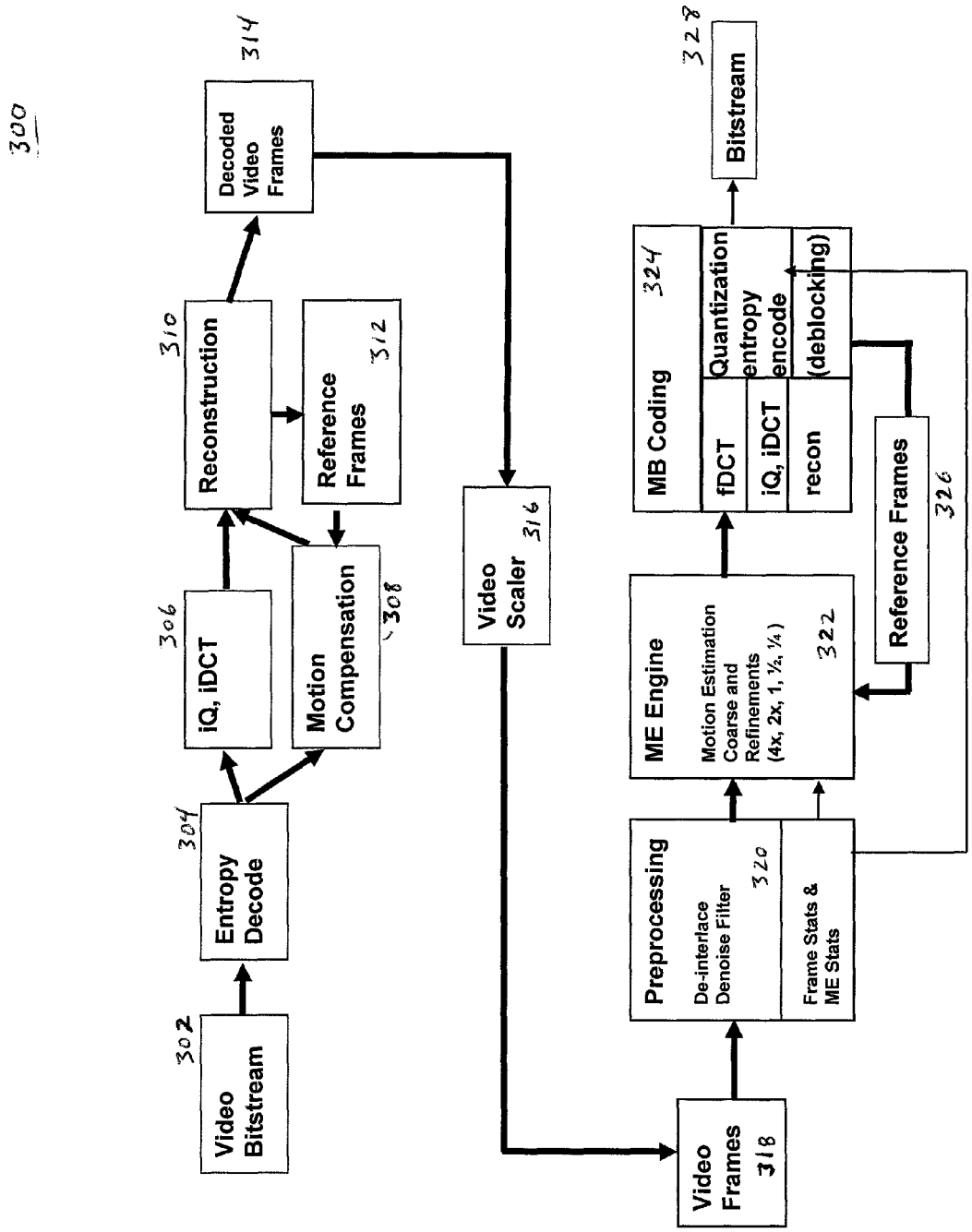
FIG. 3 illustrates a video transcoding pipeline with further processing components, under an embodiment.

FIG. 3 illustrates the video transcoding pipeline of FIG. 1 in further detail, under an embodiment. For the embodiment of FIG. 3, the video bitstream is encoded using entropy coding. Entropy coding is a special form of lossless data compression that involves arranging the image components in a "zigzag" order employing run-length encoding (RLE) algorithm that groups similar frequencies together, inserting length coding zeros, and then using Huffman coding on what the portion that remains. Huffman coding generally refers to the use of a variable-length code table for encoding a source symbol (such as a character in a file) where the variable-length code table has been derived in a particular way based on the estimated probability of occurrence for each possible value of the source symbol.

In system 300, the encoded bitstream 302 is decoded using entropy decoder 304. The decoding process involves a number of variable length decoding steps, including inverse DCT (iDCT) 306, dequantization, renormalization of outputs 310, and so on. In one embodiment, a motion estimation process 308 is performed on reference frames 312 generated by the reconstruction step 310. The decoded video frames 314 are then scaled in a video scaler process 316. The scaled video frames 318 are then encoded to the second format through an encoding process illustrated as blocks 320 to 324. The video frames are first preprocessed 320, and then input to a motion estimation engine 322. An MB coding process 324 then generates the bitstream 328 of the second format, and reference frames 326 that are fed back to the motion estimation engine 322. In one embodiment, the one or more of the encoding processes of FIG. 3 as represented by blocks 320 to 324, is implemented using the encoder process described in U.S. patent Ser. No. 12/189,060, which is incorporated in its entirety by reference.

As shown in FIG. 3, the first step in the transcoding pipeline is decoding the video bitstream 102 that has been encoded in a particular digital format. Under an embodiment, the decoding process utilizes resources provided by the GPU 206 as well as the CPU 204 to optimize processing throughput as well as the execution of other steps, such as scaling or blending that may use CPU resources, as well.

Under an embodiment, there are three different ways to decode the video bitstream 102 using the processing platform 102 that has both CPU and GPU processors. Depending upon the encoding format of the original bitstream 102, as well as the other transcode processes involved, one of the three decode methods is selected for a particular input bitstream.

In a first method, the CPU alone 204 is used to perform all of the steps related to the decode function 104. This is generally a software only implementation, in which the GPU 206 is then used to perform the scaling 106 and encoding functions. The CPU decoder method may also be referred to as a software decoder.

In a second method, a portion of the decoding process is performed on the CPU and the remainder is performed on the GPU. This is a software plus graphics chip solution that comprises a GPU programmable decoder system. In this method, the decoding performed on the CPU includes decoding steps up to the entropy decode step 304. The entropy decoding step and the optional scaling step 316 are performed on the GPU.

In a third method, dedicated hardware decoder circuitry present in the GPU (GPU hardware decoder) is employed for the decoding. Decoding is performed using a hardware/programmable video processor to decode the bitstream through the entropy decode step 304. The GPU hardware decoder may implemented in a programmable processing chip that has dedicated hardware with specific instructions, and is designed to implement certain specifications of one or more codecs. In one embodiment, the GPU hardware decoder is implemented as a UVD (Unified Video Decoder) portion of the GPU hardware, and is configured to support the hardware decode of H.264 and VC-1 video codec standards, or other codecs. In general, the UVD handles decoding of H.264/AVC, and VC-1 video codecs almost entirely in hardware. The UVD offloads nearly all of the video-decoder process for VC-1 and H.264, requiring minimal host (CPU) attention. In addition to handling VLC/CAVLC/CABAC, frequency transform, pixel prediction and inloop deblocking functions, the UVD also contains an advanced video post-processing block. Various post-processing operations from the UVD may include denoising, de-interlacing, scaling/resizing, and similar operations. The hardware/programmable video processor (e.g., UVD) may be implemented through any appropriate combination of processing circuitry that performs reverse entropy (variable length decode) uses programmable GPU shaders to do a remaining portion of the decoding operations.

For purposes of this description, "H.264" refers to the standard for video compression that is also known as MPEG-4 Part 10, or MPEG-4 AVC (Advanced Video Coding). H.264 is one of the block-oriented motion-estimation-based codecs developed by the ITU-T Video Coding Experts Group (VCEG) together with the ISO/IEC Moving Picture Experts Group (MPEG).

In one embodiment, the decode stage 304-314 of the UVD is configured to allow copying of the decoded bitstream out of the GPU 206 and into the CPU 204. This allows the CPU to perform the encoding steps 318-324 in the CPU. For this embodiment, the output from the video scaler 316 is output to CPU memory 208. This allows the system to share the processing load between the GPU and the CPU, since a copy of the data must be made available to both the GPU and the CPU. The encoding process using the UVD hardware allows a copy to be made at high speed for use by the CPU. This allows a copy of the images to be maintained by both the GPU and CPU separately. Any shared processing that is done by both the GPU and CPU thus involves the sharing of certain information rather than the transmission of the full images between the two units. This greatly reduces the bandwidth overhead required for shared CPU/GPU operations on the input video bitstream.

The scaler 316 of FIG. 3 is embodied in any appropriate scaler process or circuit that takes input image and resizes it according to a defined ratio. In general, image scaling comprises changing the picture size of a video, and is also known as transsizing. The scaling step is optional, and can be used if the output resolution differs from the media resolution. The scaler may be used to adjust the image for playback between different types of devices. For example, High Definition (HD) television transmissions are typically of size 1280×720 pixels up to 1920×1080 pixels. However, definition for digital cinema (projection in movie theaters) and digital intermediates (the format used internally in Hollywood production studios)

can be as high as approximately 3000×4000 pixels. The scaler process may be implemented as a CPU scaler or a GPU scaler, which may be a hardware scaler or programmable pixel shader.

For the embodiment in which the second method of decoding is implemented, that is, the software plus graphics chip solution in which decoding is performed on both the CPU and GPU, there are two possible variations that may be implemented through the use of the DirectX Video Acceleration (DXVA) interface defined by Microsoft Corporation. DXVA is an API (application program interface) specification that allows video decoding to be hardware accelerated and specifies how a decoder accesses the portions that are on the GPU. It allows the decoder to offload a number (e.g., the last two or three) decode pipeline stages to the GPU, after which the data is present on the GPU and ready to display. The pipeline allows certain CPU-intensive operations such as iDCT, motion compensation, deinterlacing and color correction to be offloaded to the GPU.

DXVA works in conjunction with the video rendering model used by the video card of the system. The DXVA is used by software video decoders to define a codec-specific pipeline for hardware-accelerated decoding and rendering of the codec. The pipeline starts at the CPU which is used for parsing the media stream and conversion to DXVA-compatible structures. DXVA specifies a set of operations that can be hardware accelerated and device driver interfaces (DDIs) that the graphic driver can implement to accelerate the operations. If the codec needs any of the supported operations, it can use these interfaces to access the hardware-accelerated implementation of these operations. The decoded video is handed over to the hardware video renderer where further post-processing might be applied to it before being rendered to the device. DXVA specifies the motion compensation 308 DDI, which specifies the interfaces for iDCT operations 306, Huffman coding, color correction, motion compensation, alpha blending, inverse quantization colorspace conversion and frame-rate conversion operations, among others.

In general, the DXVA API is used for Microsoft Windows compatible processing platforms. For processing platforms that use other operating systems, a DXVA-like interface can be used. Such an interface can be any API that offloads certain decode pipeline stages to the GPU. For Linux compatible processing platforms, the API may be implemented through the X-Video Motion Compensation (XvMC) API, for example. XvMC is an extension of the X video extension (Xv) for the X Window System, and allows video programs to offload portions of the video decoding process to the GPU.

For the embodiment in which the CPU performs the entropy decoding process 304 and the GPU performs the iDCT 306 and motion compensation 308 steps onward, the DXVA API dictates the information that is transmitted from the decoder 304 to each of the iDCT 306 and motion compensation 308 processes. Various different versions of the DXVA standard may be available, such as DXVA 1.0 and 2.0. For the embodiment in which the UVD performs the steps of the entropy decode process 304 onward, the DXVA 2.0 API specification may be used.

Embodiments of the decoding pipeline can be applied to video transcode and editing applications in which two or more bitstreams are processed. The different choices available for the decode process, that is CPU only, CPU plus GPU, UVD, or use of the DXVA 1.0 or 2.0 API facilitates video editing applications that may use multiple bitstreams, each of which may represent different scenes, for example.

Figure 4:
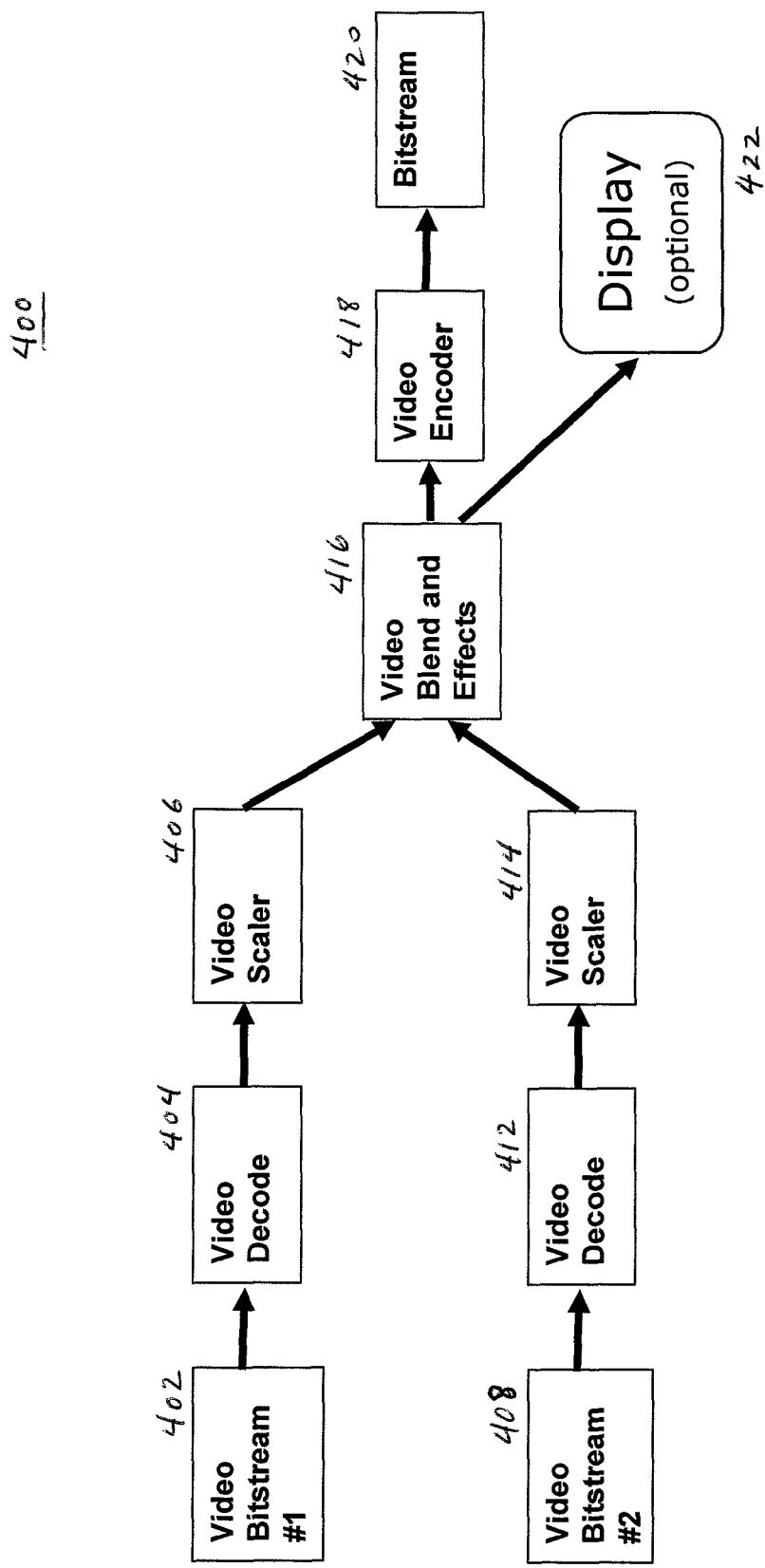
FIG. 4 illustrates a video edit pipeline that implements a video decode process, according to an embodiment.

FIG. 4 illustrates a video edit pipeline that implements a video decode process, according to an embodiment. For system 400 two bitstreams 402 and 408 are input into respective video decode processes 404 and 412. Each decoded stream is then scaled in a respective video scaler process 406 and 414. If the bitstreams 402 and 408 represent images or scenes that are to be blended, the decoded and scaled data is then input to a video blend and effects process 416. The blended image data can then be sent to a display 422, or encoded to a different format using video encoder process 418 to produce data of a second format in bitstream 420. The optional display allows for previewing of the output bitstream 420 prior to encoding. The two input bitstreams 402 and 408 may represent two video scenes that are to be blended together such as a background and foreground image, or they can represent the instance of overlap between the transition of one scene (bitstream #1) to another scene (bitstream #2).

In the video edit pipeline of FIG. 2, each of the video decode processes 404 and 412 implements one of the video decode methods described above. The video decode processes may both implement the same decode method (e.g., but use a UVD) or they may implement different decode methods. For example, one the decode processes (e.g., video decode 404) may utilize the UVD based decode process, while the other decode process utilizes the CPU only or CPU and GPU based decode process. This ensures that the UVD or other decode process is not overloaded by too many input bitstreams at one time.

Although two bitstreams are illustrated in FIG. 4, it should be noted that any number of bitstreams are possible, depending upon the requirements and constraints of the system. In general, the format of the input video bitstream will dictate which type of encoding process 404 or 416 is used for the decode process for the input bitstream. In an overall video editing application, the video editor may reconfigure the pipeline 400 based on the input bitstream format or formats, even in the event that a single bitstream may be encoded in more than one format.

The blending process 416 may utilize any built-in blending capability available on the GPU. For example, the GPU may include texture processing capabilities that allow for blending of textures using resident processes. The video effects provided within the video blend and effect process 416 may include certain commercially available effects provided by known video editors, such as blending left to right, top to bottom, or other transition effects.

Embodiments of the video decode method can be applied to standard predictive MPEG schemes. In processing a video stream, the MPEG encoder produces three types of coded frames. The first type of frame is called an "I" frame or intra-coded frame. This is the simplest type of frame and is a coded representation of a still image. In general, no processing is performed on I-frames; their purpose is to provide the decoder a starting point for decoding the next set of frames. The next type of frame is called a "P" frame or predicted frame. Upon decoding, P-frames are created from information contained within the previous P-frames or I-frames. The third type of frame, and the most common type, is the "B" frame or bi-directional frame. B-frames are both forward and backward predicted and are constructed from the last and the next P or I-frame. Both P-frames and B-frames are inter-coded frames. A codec encoder may encode a stream as the following sequence: IPBB . . . and so on. In digital video transmission, B-frames are often not used. In this case, the sequence may just consist of I-frames followed by a number of P-frames. For this embodiment, the initial I-frame is encoded as lossless, and all following P-frames are encoded as some fraction of lossless compression and some fraction as no-change.

Figure 5:
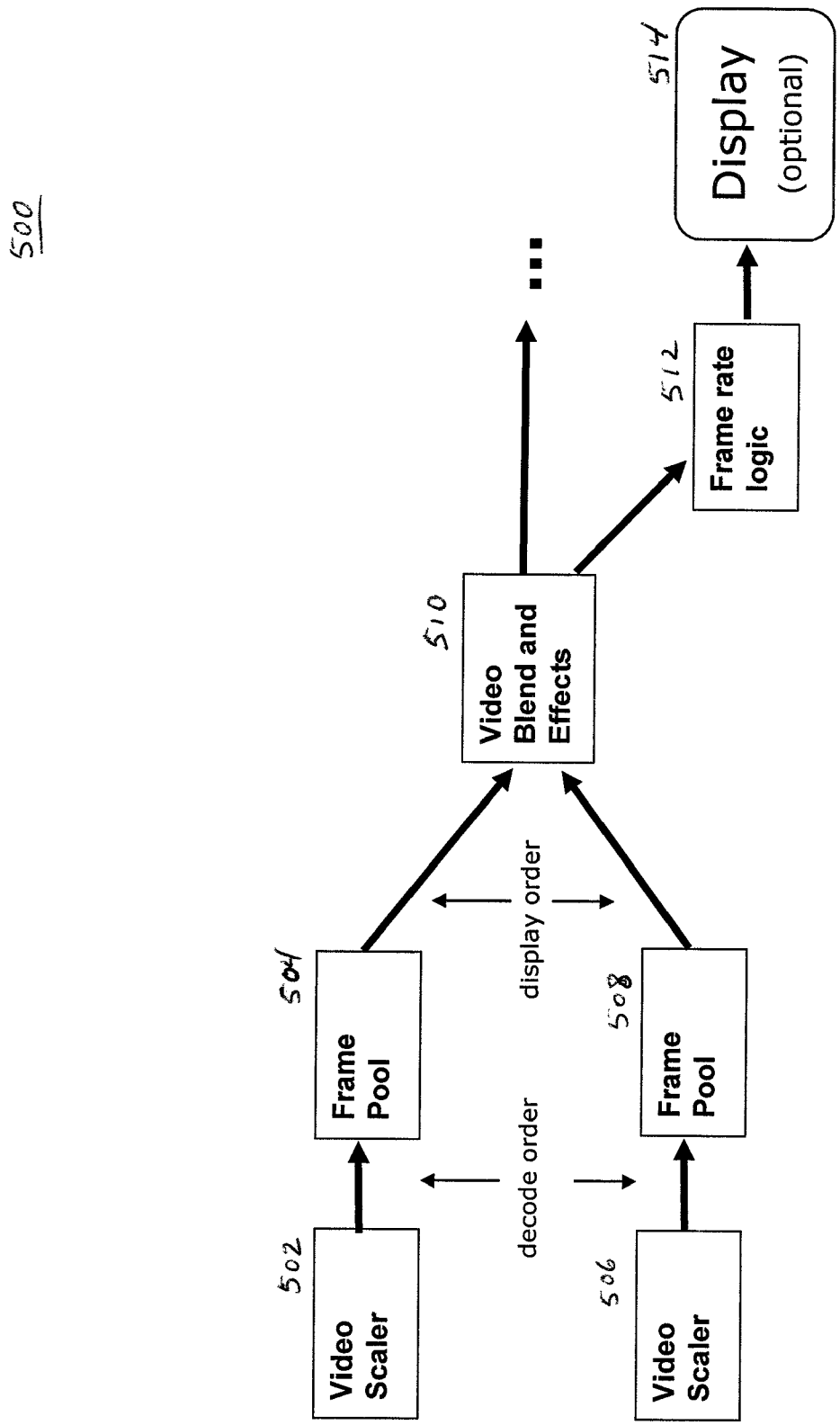
FIG. 5 illustrates a video edit pipeline including frame pooling for video data decoding, under an embodiment.

In MPEG and similar systems, decoding frames creates orders frames in a decode order, which are different than the order that they are to be displayed. In this case, the video editor pipeline of FIG. 4 may include one or more frame pools to facilitate the proper ordering of frames after a decode process. FIG. 5 illustrates a video edit pipeline including frame pooling for video data decoding, under an embodiment. As shown in system 500, the output from the video scalers 502 and 506 are input to respective frame pools 504 and 508. The frame pools pool up the frames and generate the output stream in the proper display order. Thus, as shown in FIG. 5, the frames are input into the frame pools 504 and 508 in a decode order, and are output in the proper display order for any further blending and effects processing 510. Alternatively, both streams could be blended in decode order, but only if both streams have the exact same decode order and properly synchronized, which is often not the case. Thus, it is often more advantageous to blend after pooling the frames.

The output stream can then encoded or sent to optional display 514 through a frame rate logic process 512. The frame rate logic process 512 adapts the frame processing capability to the display rate capability, i.e., the refresh rate of the display to optimize the processing and display functions of the system.

Figure 6:
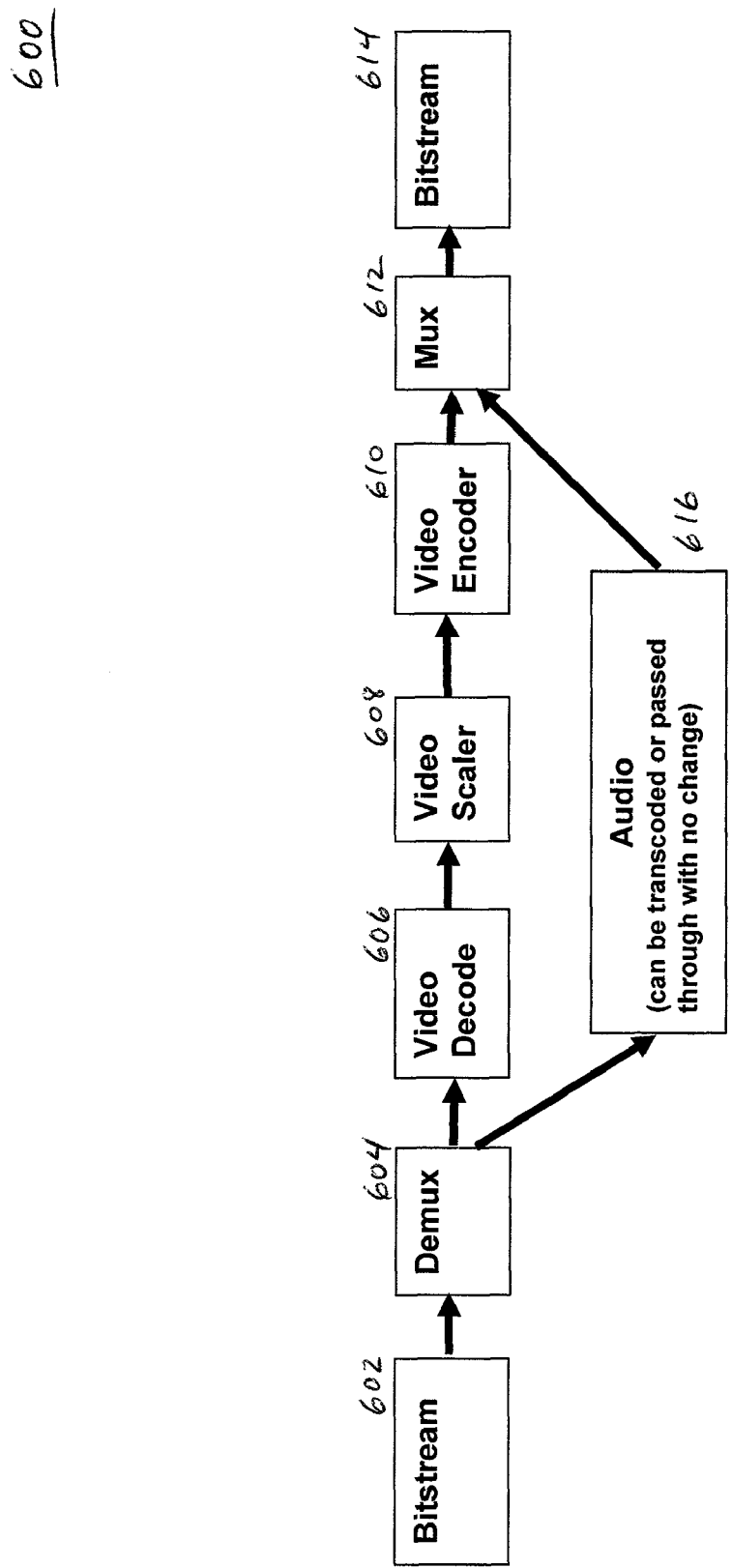
FIG. 6 illustrates a full transcoding pipeline for content that includes both video and audio content, under an embodiment.

FIG. 6 illustrates a full transcoding pipeline for content that includes both video and audio content, under an embodiment. The embodiment of FIG. 6 shows a single pipeline, though multiple channels are possible depending upon how many bitstreams and decoder processes are available. In system 600, the input audio/video bitstream 602 is input into a demultiplexer circuit 604, which separates the audio content from the video content. The video content is sent to video decode process 606 and then scaled in video scaler 608. The scaled encoded video data is then encoded in the second format by video encoder 610. The encoded video data is then multiplexed 612 with the audio data to produce the output bitstream 614. The audio data 616, which was separated out from the original bitstream 602 through the demultiplexer 604 can be transcoded itself similar to the video data, or it may be passed through for re-combination with the transcoded video data without any change. Digital audio transcoding may be used to reduce the sampling of the data, change the encoding scheme (e.g., Dolby format), degrade the quality for efficient storage or transmission, and other effects. For the video decode function 606 that transcodes the video data, any of the decode methods described above may be used.

Figure 7:
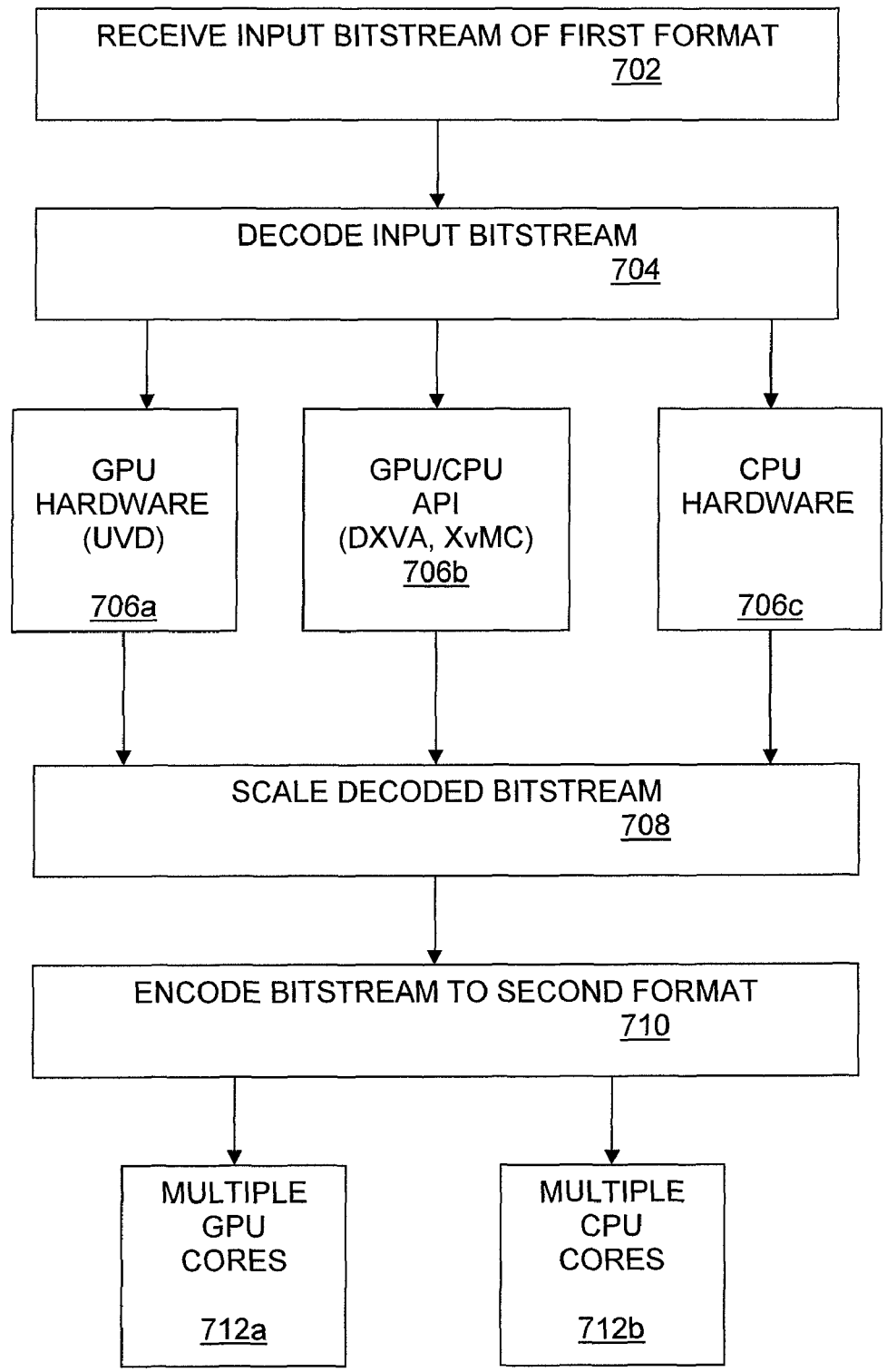
FIG. 7 is a flowchart that illustrates an overall method of transcoding digital video data using multiple decode processes, under an embodiment.

Embodiments of the transcoding process allow the selection of decoding using a number of combinations of hardware and software structures. FIG. 7 is a flowchart that illustrates an overall method of transcoding digital video data using multiple decode processes, under an embodiment. The method of FIG. 7 begins with the transcoder pipeline receiving the input bitstream, which has been formatted according to a first encoding scheme, block 702. For a single channel transcoder pipeline, a single bitstream is received and transcoded, however, any practical number of channels may be provided to transcode multiple bitstreams. The input bitstream is decoded in block 704 in accordance with one of the possible decoding schemes. The first decoding scheme utilizes the UVD GPU hardware system, block 706a; the second decoding scheme utilizes both GPU and CPU resources through a GPU programmable decoder that uses an API (e.g., DXVA, XvMC, or similar API), block 706b; and the third decoding scheme uses one or more CPU cores exclusively without any GPU support, block 706c. The decoded bitstream is then scaled using a video scaler, block 708. The scaled decoded bitstream is then encoded to the second format, block 710. The encoding process may be performed using multiple GPU cores, block 712a, or multiple CPU cores, block 712b.

In one embodiment, the choice of decoding scheme 706a-c may be selected explicitly by the user, or it may be selected automatically by a process executed in a processing system. The automatic process may select the decoding process depending upon the resources available. For example, if the UVD is available, the automatic process may dictate that the UVD be used exclusively for decoding. There may also be a defined default and one or more backup methods, such as decode using the UVD by default unless it is not available, in which case, decode using the CPU only, and so on. The scaler process may also be selected based on the automatic process depending on the decode scheme. For example, if the UVD is used for decoding, it should also be used for scaling, and if the CPU is used for decoding, it should also be used for scaling.

Embodiments of the transcode system and method combine the use of a GPU for encoding along with use of the GPU for decoding and scaling. The system enables the use of a UVD portion of GPU hardware to decode H.264 or VC-1 encoded video data, along with hardware based iDCT and motion compensation functions for MPEG-2. It also enables the use of the existing standard Microsoft API (DXVA 1.0 and 2.0) for facilitating the decode operation. The intermediate and optional step of scaling the video (such as re-sizing from one resolution to another) also employs the GPU functionality. The transcode pipeline also adds the capability of decoding multiple streams and performing a blending or special effects operations, such as for video editing. These operations can also use the GPU resources.

The processing platform of FIG. 2 embodying the transcode pipeline may be implemented in any type of computing device that is capable of generating, playing back or otherwise processing digital video data. Such a computing device may be a computer or a mobile computing or communication device, such as a notebook computer, personal digital assistant (PDA), mobile phone, game console, or any similar class of mobile computing device with sufficient processing, communication, and control or AV (audiovisual) playback capability. The computing device may be coupled to other computing devices, resources or data stores directly or indirectly through one or more networks that may comprise the Internet, a Wide Area Network (WAN), a Local Area Network (LAN), or any combination thereof.

Embodiments are applicable to all transcoding where the input format is decoded to raw pixels, then re-encoded into a different or the same codec, in a different resolution or the same resolution, and a different bitrate or the same bitrate or quality settings. The transcoding operation may be compressed domain transcoding, which is a method used by programs that compress DVD video, such as for DVD backup programs.

Although embodiments described herein have been directed to transcoding applications, it should be noted that such embodiments are also applicable to other applications, such as transrating. For example, lower bitrate transrating is a process similar to transcoding in which files are coded to a lower bitrate without changing video formats; this can include sample rate conversion, but may use the same sampling rate but higher compression. Transrating is used to fit a given media into smaller storage space, such as fitting a DVD content onto a video CD, or transmitting content over a lower bandwidth channel.

Although embodiments have been described with reference to graphics systems comprising GPU devices or visual processing units (VPU), which are dedicated or integrated graphics rendering devices for a processing system, it should be noted that such embodiments can also be used for many other types of video production engines that are used in parallel. Such video production engines may be implemented in the form of discrete video generators, such as digital projectors, or they may be electronic circuitry provided in the form of separate IC (integrated circuit) devices or as add-on cards for video-based computer systems.

In one embodiment, the system including the GPU/CPU processing platform comprises a computing device that is selected from the group consisting of: a personal computer, a workstation, a handheld computing device, a digital television, a media playback device, smart communication device, and a game console, or any other similar processing device.

Aspects of the system described herein may be implemented as functionality programmed into any of a variety of circuitry, including programmable logic devices ("PLDs"), such as field programmable gate arrays ("FPGAs"), programmable array logic ("PAL") devices, electrically programmable logic and memory devices and standard cell-based devices, as well as application specific integrated circuits. Some other possibilities for implementing aspects include: memory devices, microcontrollers with memory (such as EEPROM), embedded microprocessors, firmware, software, etc. Furthermore, aspects of the video transcoding system may be embodied in microprocessors having software-based circuit emulation, discrete logic (sequential and combinatorial), custom devices, fuzzy (neural) logic, quantum devices, and hybrids of any of the above device types. The underlying device technologies may be provided in a variety of component types, e.g., metal-oxide semiconductor field-effect transistor ("MOSFET") technologies like complementary metal-oxide semiconductor ("CMOS"), bipolar technologies like emitter-coupled logic ("ECL"), polymer technologies (e.g., silicon-conjugated polymer and metal-conjugated polymer-metal structures), mixed analog and digital, and so on.

It should also be noted that the various functions disclosed herein may be described using any number of combinations of hardware, firmware, and/or as data and/or instructions embodied in various machine-readable or computer-readable media, in terms of their behavioral, register transfer, logic component, and/or other characteristics. Computer-readable media in which such formatted data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof. Examples of transfers of such formatted data and/or instructions by carrier waves include, but are not limited to, transfers (uploads, downloads, e-mail, etc.) over the Internet and/or other computer networks via one or more data transfer protocols (e.g., HTTP, FTP, SMTP, and so on).

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

The above description of illustrated embodiments of the video transcoding system is not intended to be exhaustive or to limit the embodiments to the precise form or instructions disclosed. While specific embodiments of, and examples for, processes in graphic processing units or ASICs are described herein for illustrative purposes, various equivalent modifications are possible within the scope of the disclosed methods and structures, as those skilled in the relevant art will recognize.

The elements and acts of the various embodiments described above can be combined to provide further embodiments. These and other changes can be made to the disclosed system in light of the above detailed description.

In general, in the following claims, the terms used should not be construed to limit the disclosed method to the specific embodiments disclosed in the specification and the claims, but should be construed to include all operations or processes that operate under the claims. Accordingly, the disclosed structures and methods are not limited by the disclosure, but instead the scope of the recited method is to be determined entirely by the claims.

While certain aspects of the disclosed embodiments are presented below in certain claim forms, the inventors contemplate the various aspects of the methodology in any number of claim forms. For example, while only one aspect may be recited as embodied in machine-readable medium, other aspects may likewise be embodied in machine-readable medium. Accordingly, the inventor reserves the right to add additional claims after filing the application to pursue such additional claim forms for other aspects.

What is claimed is:

1. An apparatus for transcoding a video stream from a first digital format to a second digital format, comprising:
   a decoder receiving the video stream encoded in the first digital format and producing a decoded video stream, wherein the decoder utilizes graphics processing unit (GPU) circuitry and is implemented through a combination of the GPU circuitry and at least one of a GPU hardware decoder, a GPU programmable decoder, and a central processing unit (CPU) software decoder;
   a scaler changing the picture size of the decoded video stream to produce a scaled decoded video stream, wherein the scaler is implemented through one of a CPU scaler or a GPU scaler wherein the scaled decoded video stream is output to both the CPU and GPU, wherein the CPU and GPU are configured to share in processing the video stream; and
   an encoder receiving the scaled decoded video stream and producing an output stream encoded in the second digital format.

2. The apparatus of claim 1 wherein the video stream is received in a transcoding pipeline system that comprises a processor platform including at least one GPU and one CPU.

3. The apparatus of claim 2 wherein the GPU hardware decoder comprises a hardware/programmable video processor in which a first portion of a decode operation is performed by GPU hardware and a second portion of the decode operation is performed by programmable GPU shaders within the GPU.

4. The apparatus of claim 2 wherein the GPU programmable decoder includes an application program interface (API) that allows the decoder to be hardware accelerated by offloading certain operations executed by the CPU to be executed by the GPU.

5. The apparatus of claim 1 wherein the video stream of the first digital format comprises a plurality of video bitstreams and the decoder component comprises a plurality of decoder components, with each video bitstream of the plurality of video bitstreams input to a respective decoder component for decoding.

6. The apparatus of claim 5 further comprising a video blending component combining the plurality of video bitstreams into a blended output stream in accordance with a defined blending effect.

7. The apparatus of claim 6 wherein the plurality of video bitstreams comprise MPEG video data, the apparatus further comprising a plurality of frame pools reordering a decode order of MPEG frames into a display order.

8. The apparatus of claim 7 wherein the output stream is transmitted to a display device.

9. The apparatus of claim 8 further comprising a frame rate logic component matching a frame rate of the blended output stream to a refresh rate of the display device.

10. The apparatus of claim 1 wherein the scaled decoded video stream is transmitted to a memory device coupled to the CPU.

11. The apparatus of claim 1 wherein a first copy of the scaled decoded video stream is available to the CPU, and a second copy of the scaled decoded video stream is available to the GPU.

12. The apparatus of claim 1 wherein the video stream includes an audio channel, the apparatus further comprising:
a demultiplexer separating the audio channel from video frames comprising the video stream prior to generation of the decoded video stream; and
a multiplexer adding back the audio channel to the output stream encoded in the second digital format and encoding in the encoder.

13. The apparatus of claim 12 wherein the audio channel is transcoded from a first audio format to a second audio format prior to being added back to the output stream.

14. A method of transcoding a video stream from a first digital format to a second digital format, comprising:
receiving the video stream encoded in the first digital format from a datastore; decoding the received video stream to produce a decoded video stream, wherein the decoding method is implemented through a combination of graphics processing unit (GPU) resources and central processing unit (CPU) resources, the decoding method utilizing the GPU resources in combination with at least one of a GPU hardware decoder, a GPU programmable decoder, and a CPU software decoder;
scaling the picture size of the decoded video stream to produce a scaled decoded video stream, wherein the scaler is implemented through one of a CPU scaler or a GPU scaler, wherein the CPU and GPU are configured to share in processing the video stream; and
encoding the scaled decoded video stream to produce an output stream encoded in the second digital format.

15. The method of claim 14 further comprising selecting an appropriate decoding method using one of the GPU hardware decoder, the GPU programmable decoder, or the CPU software decoder.

16. The method of claim 15 wherein the selecting step is performed by one of user selection, an automatic process, or determination by the first digital format.

17. The method of claim 14 further comprising transmitting the scaled decoded video stream is transmitted to a memory device coupled to a CPU on a processing platform including the CPU and a GPU so that a first copy of the scaled decoded video stream is available to the CPU and a second copy of the scaled decoded video stream is available to the GPU.

18. The method of claim 14 wherein the GPU hardware decoder comprises a hardware/programmable video processor in which a first portion of a decode operation is performed by GPU hardware and a second portion of the decode operation is performed by programmable GPU shaders within the GPU, and wherein the GPU programmable decoder includes an application program interface (API) that allows the decoder to be hardware accelerated by offloading certain operations executed by the CPU to be executed by the GPU.

19. The method of claim 14 wherein the video stream of the first digital format comprises a plurality of video bitstreams and the decoder component comprises a plurality of decoder components, with each video bitstream of the plurality of video bitstreams input to a respective decoder component, the method further comprising blending the plurality of video bitstreams into a blended output stream in accordance with a defined blending effect.

20. The method of claim 19 wherein the plurality of video bitstreams comprise MPEG video data, the method further comprising: pooling the plurality of frames into frame pools to reorder a decode order of MPEG frames into a display order; and transmitting the output stream to a display device.

21. The method of claim 20 further comprising matching a frame rate of the blended output stream to a refresh rate of the display device.

22. A video processing system comprising: a central processing unit (CPU);
a graphics processing unit (GPU) coupled to the CPU; and
a video transcoder pipeline transcoding a video stream from a first digital format to a second digital format, the transcoder pipeline comprising a decoder receiving the video stream encoded in the first digital format and producing a decoded video stream, wherein the decoder utilizes graphics processing unit (GPU) circuitry and is implemented through a combination of the GPU circuitry and at least one of a GPU hardware decoder, a GPU programmable decoder, and a central processing unit (CPU) software decoder, a scaler changing the picture size of the decoded video stream to produce a scaled decoded video stream, wherein the scaler is implemented through one of a CPU scaler or a GPU scaler, wherein the CPU and GPU are configured to share in processing the video stream, and an encoder receiving the scaled decoded video stream and producing an output stream encoded in the second digital format.

23. The system of claim 22 wherein the GPU hardware decoder comprises a hardware/programmable video processor in which a first portion of a decode operation is performed by GPU hardware and a second portion of the decode operation is performed by programmable GPU shaders within the GPU.

24. The system of claim 22 wherein the GPU programmable decoder includes an application program interface (API) that allows the decoder to be hardware accelerated by offloading certain operations executed by the CPU to be executed by the GPU.

25. The system of claim 22 wherein an appropriate decoding method using one of the GPU hardware decoder, the GPU programmable decoder, or the CPU hardware decoder is selected through one of user selection, an automatic process, or determination by the first digital format.

26. The apparatus of claim 1, wherein the CPU performs an entropy decoding process and the GPU performs motion compensation.

27. The apparatus of claim 5, wherein the bitstreams are blended in a video blend.

* * * * *